(12) United States Patent
Osato

(10) Patent No.: US 6,764,133 B2
(45) Date of Patent: Jul. 20, 2004

(54) AUDIO SYSTEM FOR CANOPIES USED WITH STROLLERS OR ROCKERS

(75) Inventor: Takashi Osato, Bloomingdale, IL (US)

(73) Assignee: Combi International Corporation, Carol Stream, IL (US)

(*) Notice: Subject to any disclaimer, the term of this patent is extended or adjusted under 35 U.S.C. 154(b) by 0 days.

(21) Appl. No.: 09/883,612

(22) Filed: Jun. 18, 2001

(65) Prior Publication Data

US 2002/0140260 A1 Oct. 3, 2002

Related U.S. Application Data

(60) Provisional application No. 60/279,893, filed on Mar. 29, 2001.

(51) Int. Cl.[7] .............................................. A47C 31/00
(52) U.S. Cl. .............................. 297/217.4; 297/184.13; 297/184.17
(58) Field of Search ..................... 297/217.4, 217.5, 297/183.6, 184.13, 184.17

(56) References Cited

U.S. PATENT DOCUMENTS

| | | | | |
|---|---|---|---|---|
| 4,440,443 A | * | 4/1984 | Nordskog | 297/397 |
| 4,539,700 A | * | 9/1985 | Sato | 224/230 |
| 4,978,166 A | * | 12/1990 | James | 297/184.13 |
| 5,029,239 A | * | 7/1991 | Nesbit | 135/16 |
| 5,083,837 A | * | 1/1992 | Roach | 297/216.11 |
| 5,309,586 A | * | 5/1994 | Sies et al. | 5/482 |
| 5,395,157 A | * | 3/1995 | Rollo et al. | 297/183.1 |
| 5,564,784 A | * | 10/1996 | Felling | 297/344.23 |
| 5,580,072 A | * | 12/1996 | Monneret | 280/47.38 |
| 5,624,152 A | * | 4/1997 | Yoshie et al. | 280/642 |
| 5,699,558 A | * | 12/1997 | Min | 2/338 |
| 5,795,018 A | * | 8/1998 | Schumacher et al. | 297/184.17 |
| 6,039,393 A | * | 3/2000 | Roh | 297/184.13 |
| 6,097,822 A | * | 8/2000 | Min | 2/102 |
| 6,170,910 B1 | * | 1/2001 | Bapst | 16/377 |
| 6,354,044 B1 | * | 3/2002 | Lagace, Jr. | 52/79.5 |

FOREIGN PATENT DOCUMENTS

| | | |
|---|---|---|
| JP | 128862/1985 | 8/1985 |
| JP | 45174/1992 | 4/1992 |
| JP | 06-008826 | 1/1994 |
| JP | 86385/1994 | 12/1994 |
| JP | 07-070804 | 3/1995 |
| JP | 09-191984 | 7/1997 |
| WO | PCT/JP02/02994 | 5/2002 |

* cited by examiner

Primary Examiner—Peter M. Cuomo
Assistant Examiner—Stephanie Harris
(74) Attorney, Agent, or Firm—Fitch, Even, Tabin & Flannery

(57) ABSTRACT

An audio system is provided for use with a child stroller or rocker, or with other child-carrying seats that use a canopy. The audio system is to be carried by the canopy of the child stroller or rocker. The audio system generally includes an audio source, speakers, and an electrical lead for connecting the audio source and speakers. The audio source and speakers are carried in pockets sewn to the outside of the canopy, and the components of the audio system can be easily removed from the canopy for repair or replacement.

14 Claims, 10 Drawing Sheets

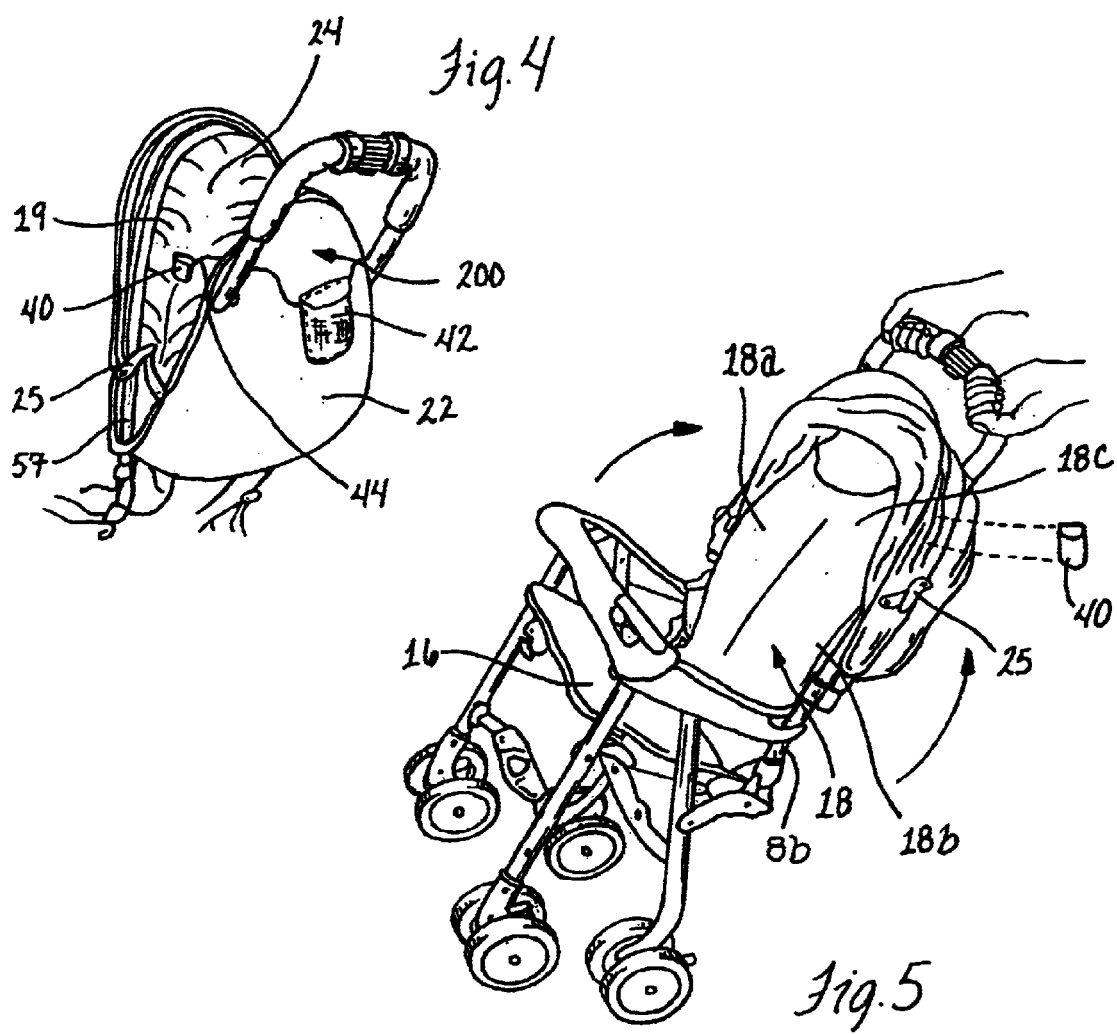

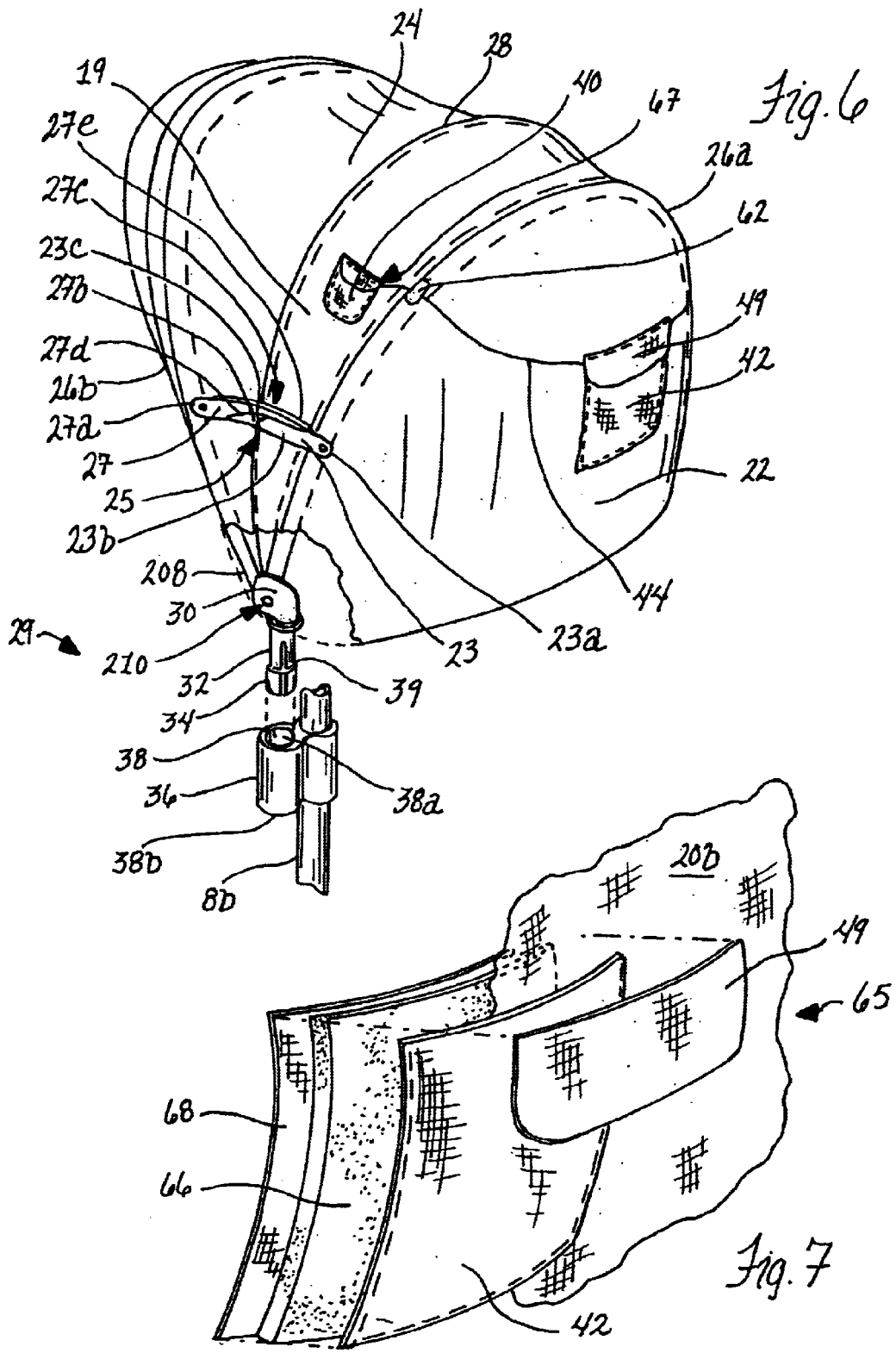

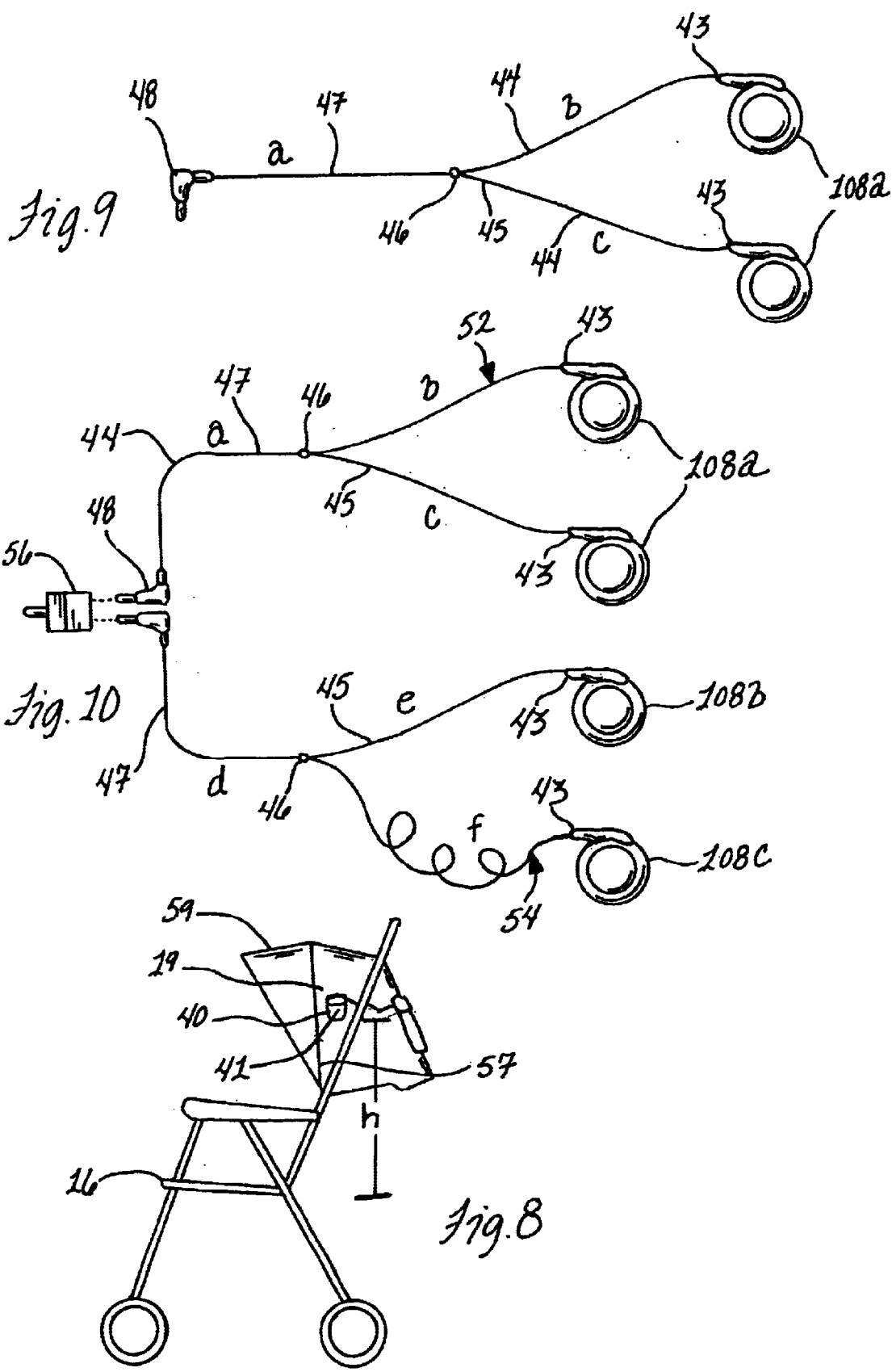

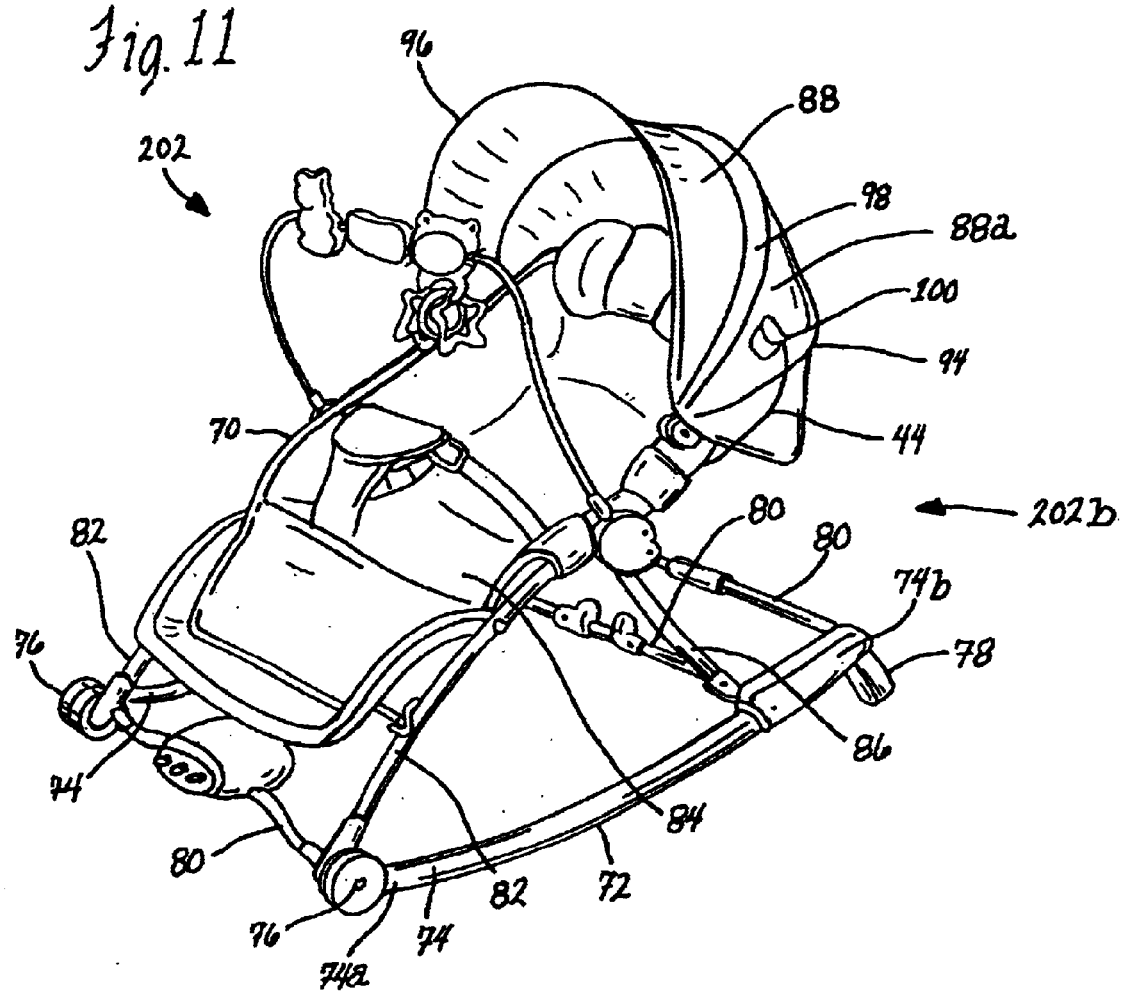
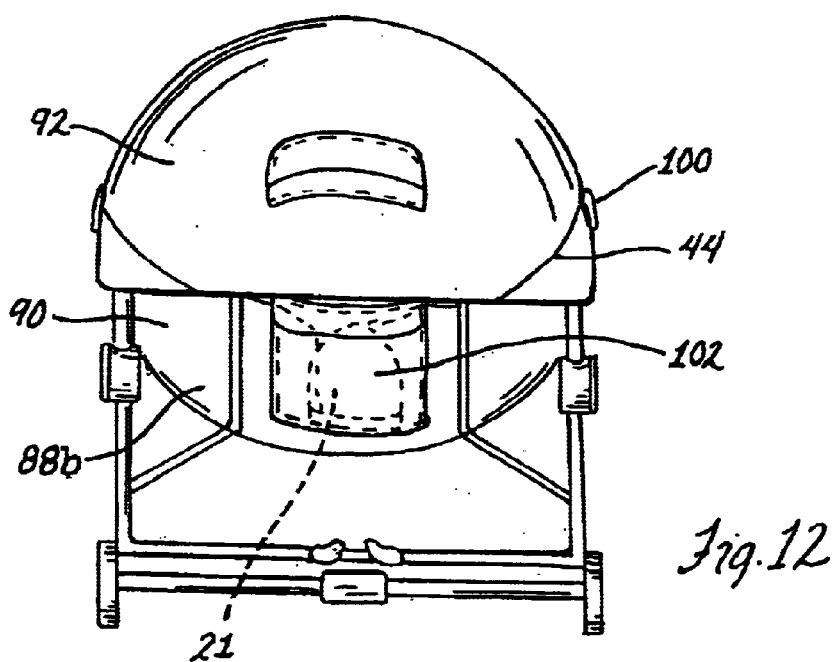

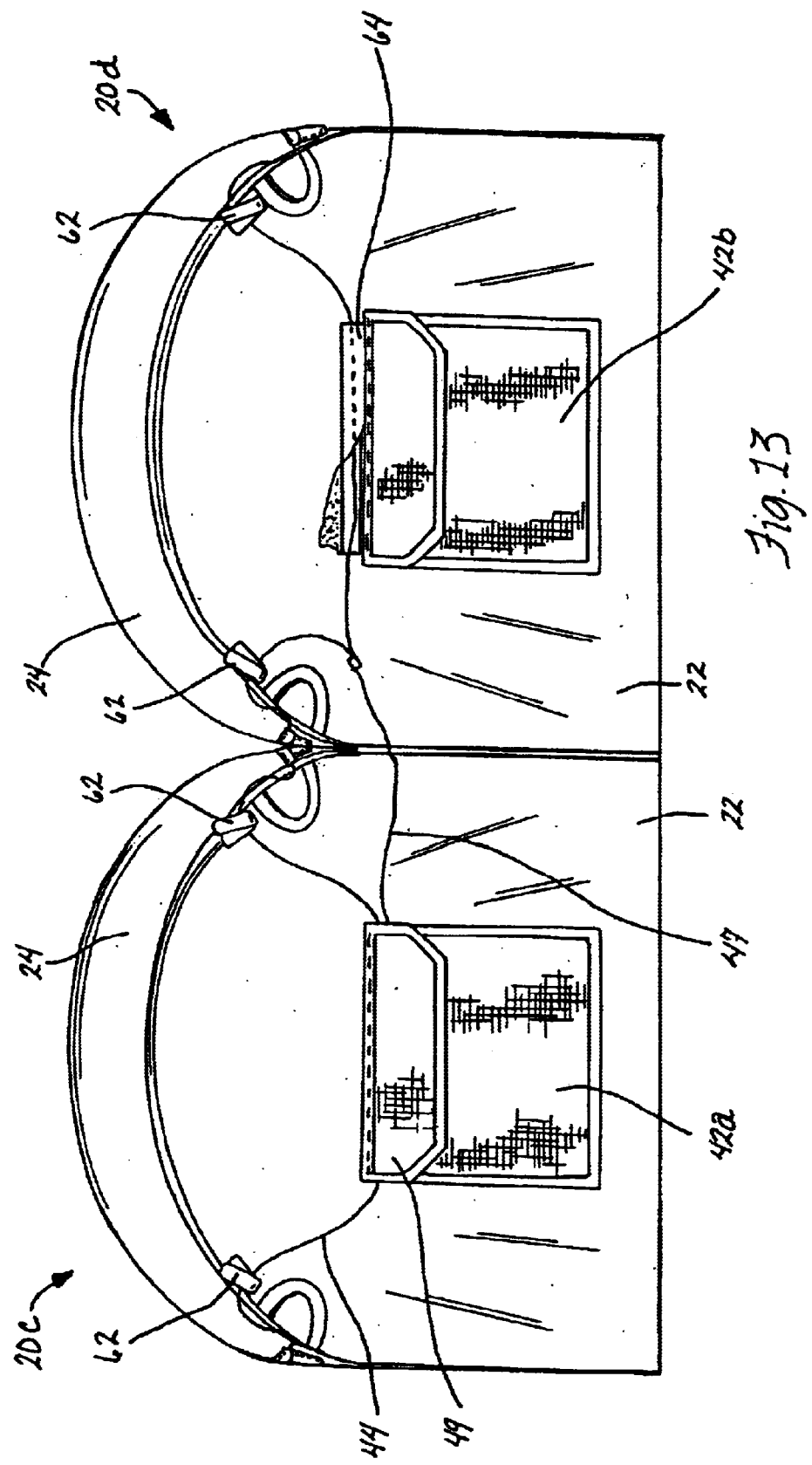

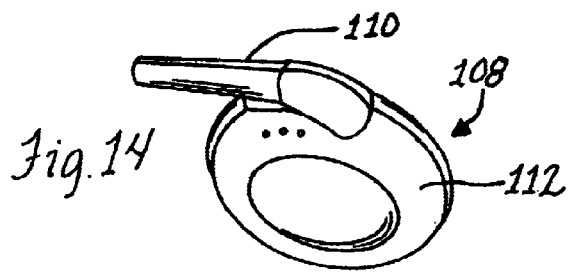
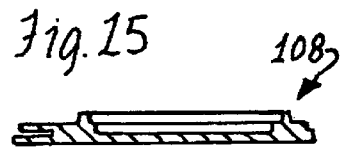
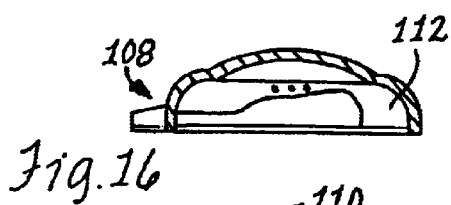
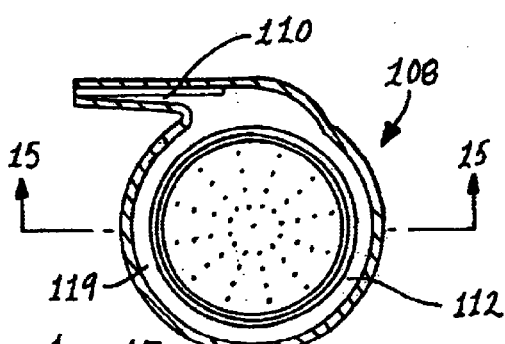
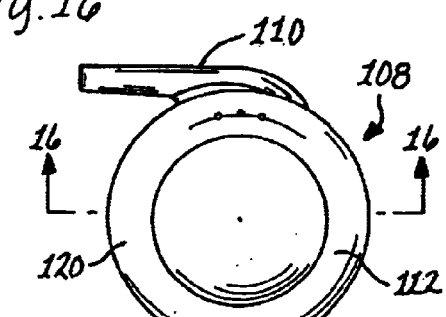
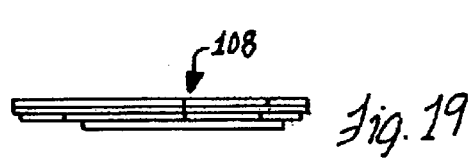
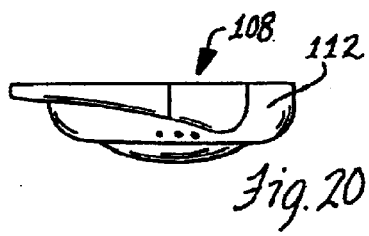
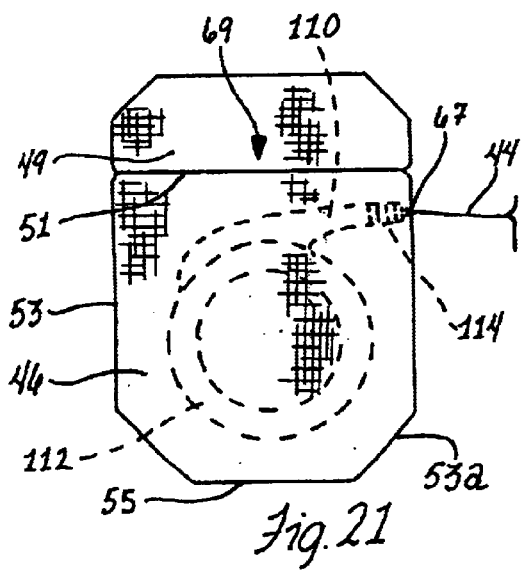
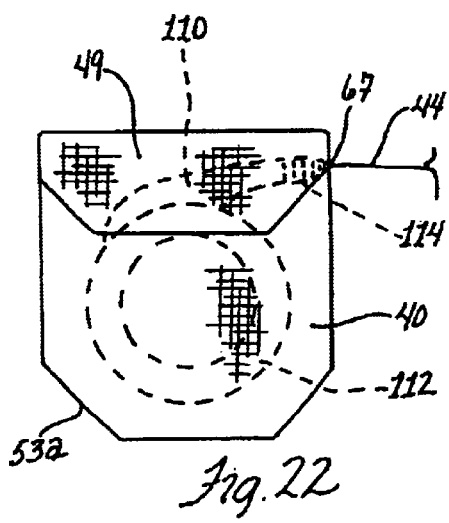

AUDIO SYSTEM FOR CANOPIES USED WITH STROLLERS OR ROCKERS

This application claims the benefit of Provisional application 60/279,893 filed Mar. 29, 2001.

FIELD OF THE INVENTION

The present invention relates to an audio system, and, more specifically, to an audio system for a retractable canopy such as used with child strollers and rockers.

BACKGROUND OF THE INVENTION

One major challenge with children is to keep them comfortable and happy for an extended period of time. To this end, audio systems have been developed that can play music or other sounds that have a soothing effect on a child. Some of these audio systems use an audio source (such as a portable CD player, mini disc player, tape cassette player, MP3 player, or radio), speakers, and electrical leads.

One disadvantage of prior art audio systems is the use of electrical leads and speakers that are built into a child-carrying device, such as a child safety seat in a car. More particularly, child car seats typically have rigid plastic vertical side panels that face inward toward each other and confine the child's lateral movement to the seating area therebetween. The speakers are usually disposed toward the upper end of these side panels in the interior thereof with side panel apertures provided for emitting sound therefrom. Leads can extend internally across the backrest to connect the speakers and then down at least one of the side panels to connect to the audio source disposed in a recessed compartment molded into the plastic base of the seat. Only a jack at the end of the speaker line resides in the base compartment. Obviously, if the leads or speakers become defective, repair or replacement of the leads or speakers is difficult. The child device must be physically altered in order to remove the defective leads or speakers and to repair them or to replace them with new ones. Where the speakers and leads are incorporated between fabric layers of an apron adapted to fit over a child car seat, such as disclosed in U.S. Pat. No. 5,482,352 to Leal et al., there is the problem of how one is to clean or wash the apron without being able to remove these electrical components. As these aprons are typically in need of fairly regular cleanings, such as in a washing machine, it is clear that such a built-in audio system is not very practical.

Strollers lack rigid side panels akin to those in car seats. Instead, stroller frames support flexible fabric material when attached to the frame rods so that the child's weight generally conforms the fabric about their body, including at least partially on their sides and on opposite sides of the child's head. Probably because of the potential engagement of the fabric with the child's head, hard plastic speakers have not been built into the fabric thereat as has been done with child car seats, and the aprons therefor.

An extendible canopy is often provided for covering above the seating area. The canopy has support hoops or ribs that are pivotal for collapsing the fabric material therebetween when the canopy is retracted. The fabric is stretched and taut between the ribs when the canopy is in its full extended position. The canopy fabric is a single layer of material. Accordingly, with this construction and dynamic operational requirements, audio systems specifically adapted for use with strollers and canopies therefor have not been provided.

Accordingly, there is a need for an audio system that is adapted for use with a child stroller. It would also be desirable to provide an audio system that has conveniently replaceable components. More specifically, there is a need for an audio system that is well adapted for use with a canopy of a stroller or the like that can be extended and retracted.

SUMMARY OF THE INVENTION

In accordance with the present invention, an audio system is provided that can be used with a child stroller or rocker, preferably with the canopy covering the seating thereof. It should be noted that the audio system of the present invention can be used with other child devices that employ a canopy that can be extended or retracted as by pivoting. In this regard, the preferred audio system is self-contained with the canopy in that the canopy preferably removably mounts to the child device and the audio system is carried by the canopy in pockets sewn or otherwise attached thereto and in which can be received speakers and an audio source, as will be described in more detail herein. Thus, in the preferred form, it is the canopy that carries the audio system allowing the separate fabric seat to be removed from, for instance, the stroller frame for washing, maintenance and the like. Further, the audio system allows for components of the system, e.g., speakers and speaker wires, to be easily removed or replaced without requiring alteration of the canopy itself.

The audio system herein may be used to accomplish several purposes. The audio system may be used to play soothing music to help settle an infant or help the infant get to sleep. In addition, the audio system may be used to play music to stimulate the musical talent of young children or to play educational CDs or tapes to enhance learning. The audio system may also be used to play CDs and tapes of stories or music to entertain the child.

As mentioned, in the preferred form, the audio system is associated with the canopy of the child stroller or rocker. The audio system generally includes an audio source, such as a portable CD player, mini disc player, tape cassette player, MP3 player, or radio; speakers; and an electrical lead for connecting the audio source and speakers. The speakers are contained in pockets located along the opposing outer sides of the canopy, and the speakers may be easily inserted in and removed from these pockets.

More specifically, the speaker sizing and pocket placement have been carefully coordinated and selected so that interference with normal operation of the canopy is substantially avoided while also providing optimum sound quality for being heard by a child in the seating area of the stroller, for example. Canopies are known that use arcuate support members or hoops sewn into the fabric at their front and rear ends, as well as one intermediate the canopy ends between which the single layer fabric material of the canopy is stretched as the canopy is extended over the seating area. The support members converge toward each other at their lower ends on opposite lower sides of the canopy. Their upper and arcuate portions are pivotally shifted closely adjacent to or against each other with the canopy retracted and are spaced from each other when it is extended. It is in the area between the support member upper portions that there is the greatest amount of fabric material for the pockets; however, this is generally too far up on the canopy to effectively convey sound from the speakers for the desired stereophonic effect to be heard therefrom in the seating area therebelow.

To this end, the audio system herein makes use of the area between the support members generally along their vertical runs below the top region of the canopy despite the lack of the canopy fabric surface area thereat by keeping the speaker assemblies including the housing therefor to a very compact size while not sacrificing too much, if at all, in the way of their sound quality. This allows the pockets to be smaller and to be attached to the canopy fabric between the converging vertical portions of the support members at an optimum location for providing the stereophonic effect, e.g., generally aligned with the vertical position of a typical child's head when a child is supported in the stroller's seating area. In addition, the small size speakers minimize the chance that the speakers will become clamped between the canopy support members as it is being retracted, and thus preventing full retraction of the canopy. Instead, with the small size pockets and speakers therein, the speakers and pockets will more likely tend to find their way into the portions of the folds of canopy fabric material as it collapses between the support members that are interior of the canopy and spaced from the portions of the support members that come into position closely adjacent to or engaged against each other. Further, even if the speakers are captured between the support members during canopy retraction, their low profile still allows the shifted support members to be closely adjacent to each other for substantial full retraction of the canopy.

Thus, the position of the pockets takes into account several factors associated with optimizing both the quality of the sounds emanating from the speakers as experienced by a child in the seating area of the stroller and operation of the canopy for retraction and extension thereof. As discussed, the canopy includes pivotal arcuate forward and rearward support members pivotally attached at their bottom ends, and an intermediate arcuate support member between the forward and rearward support members. Accordingly, the support members all diverge from each other as they extend upwardly to support the material of the canopy at the top thereof.

It is preferred that a pivot hinging mechanism be operatively connected to the forward and rearward support members at a position above the bottom ends thereof on either side of the canopy. The hinging mechanism provides a friction cam lock when the canopy is fully extended while allowing it to be retracted as by pulling upward on the cam lock members at their pivot for pivoting of the hinging mechanism members thereby releasing the lock. Thus, while there is a lot of material at the top of the canopy onto which pockets can be sewn, such placement does not maximize the stereophonic effect of the speakers. On the other hand, there is not as much material between the support members as they begin to converge toward the bottom of the canopy, and the hinging mechanism is also disposed in this lower region of the canopy. Having the pockets very low on the canopy while possibly achieving good stereophonic sound quality can interfere with the normal pivoting operation that the support members and hinging mechanism undergo during retraction of the canopy. Herein, the pocket placement has been carefully oriented so as to provide the maximum in stereophonic effect while still allowing the canopy to be operated without experiencing interference from the speakers in the pockets.

The speakers preferably are retained in the pockets, in part, by flaps attached to the tops of the pockets. Most preferably, the pockets are provided with upper openings through which the speakers can be moved, and the flaps can be attached to the canopy above the associated upper opening so as to be able to substantially close over the openings. The speakers can also be retained in the pockets, when the canopy is retracted, as by action of the adjacent support members so that the pockets are folded inwardly of the support members, as discussed, minimizing the chance that the speakers may fall out of the pockets, such as if the pockets were left open. This also allows the speakers to be hidden when not in use by retraction of the canopy.

The speakers are connected to ends of an electrical lead having a split construction. When the speakers are inserted into the side pockets of the canopy, the electrical lead is disposed along the outside of the canopy. The split ends of the electrical lead are connected together to form a common electrical lead that terminates in a jack. The jack, in turn, can be connected to an audio source, such as a CD player, mini disc player, cassette player, MP3 player, or radio. The electrical lead preferably is of a predetermined length that is coordinated with the pocket placement about the canopy so that as the lead extends along the outside of the canopy, there is a minimum of lead line drooping or hanging. The electrical lead may also be retained to the canopy by holders, most preferably including velcro strips, located on the outer surface of the canopy to further minimize the amount of drooping of the lead line.

The audio source is located in a pocket associated with the rear hood of the canopy. The pocket is large enough to easily accommodate a variety of different audio sources, including older model radios, tape cassette players, and CD players that are relatively bulky in size. The pocket for the audio source also has a flap to retain the audio source therein. In addition, the audio source pocket can be cushioned by a pad provided on the inner surface of the canopy to minimize discomfort to a child occupying the child–carrying device.

These and other advantages are realized with the described audio system. The invention's advantages may be best understood from the following detailed description taken in conjunction with the accompanying drawings.

BRIEF DESCRIPTION OF THE DRAWINGS

FIGS. 4–5 are perspective views of the stroller showing the retraction of the canopy (FIG. 4) and folding of the frame of the stroller for storage (FIG. 5);

FIG. 6 is an enlarged perspective view of the canopy showing one of the pivot mounts and the lower resilient posts of the canopy and stroller frame sleeves for removably receiving the canopy posts;

FIG. 7 is an exploded perspective view of the canopy pocket for the audio source, a pad, and a pad covering therefor;

FIG. 8 is a schematic side elevational view of the stroller with the canopy in its fully extended position to show the level of the speaker pocket relative to the seating area;

FIG. 9 is a plan view of the speakers and electrical lead having a split end portion for being connected to both speakers and a common end portion terminating in a plug jack for being connected to the audio source;

FIG. 10 is a plan view of the speakers and electrical lead of the audio system for use with a twin stroller showing a twin jack for being connected to a pair of jacks as shown in FIG. 9;

FIG. 11 is a perspective view of an activity rocker incorporating the present audio system with a canopy therefor;

FIG. 12 is a rear elevational view of the activity rocker showing the rear pocket with an audio source therein;

FIG. 13 is a rear elevational view of a twin stroller incorporating the present audio system on canopies thereof;

FIGS. 14–20 show various views of one of the low profile speakers of the present audio system;

FIGS. 21–22 are side elevational views of one of the pockets having a speaker therein and showing a lead extending from a stem portion of the speaker and out of the pocket;

DETAILED DESCRIPTION OF THE PREFERRED EMBODIMENTS

Figure 2:
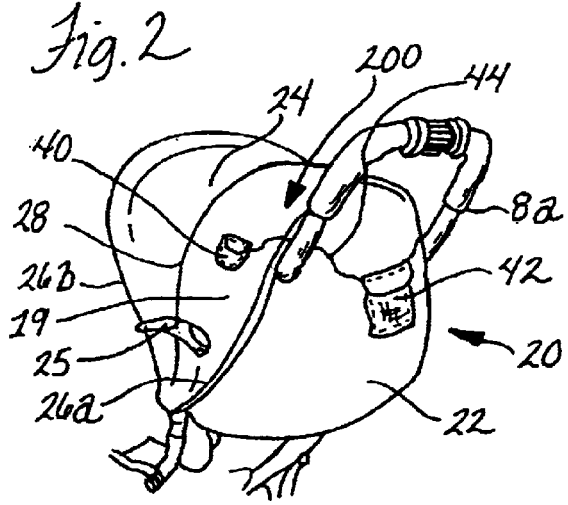

The present invention is an audio system generally designated with reference numeral 200 (FIGS. 2–4) for use with a child-carrying device 202 having a canopy 20 that can be extended or retracted. The system can include two speakers 108 connected to an audio source 21 (FIG. 12) (such as a CD player, mini disc player, MP3 player, tape recorder/player, or radio), all of which are carried in pockets 40 on the retractable canopy 20 mounted to the stroller 202a, in this instance. The positions of the speaker pockets 40 and the dimensions of the speakers 108 are carefully selected to take into account their preferred use with a canopy 20, its construction and dynamic operation thereof. To this end, the speakers 108 and speaker pockets 40 have predetermined sizes and positions on the canopy 20 to maximize the stereophonic effect for a child occupying the device 202, to minimize interference with extension and retraction of the canopy 20, and to generate high sound quality and volume. In addition, the audio components are not built into the canopy 20, as in other audio systems for child-carrying devices 202, and therefore allow easy removal and replacement of components.

Figure 1:
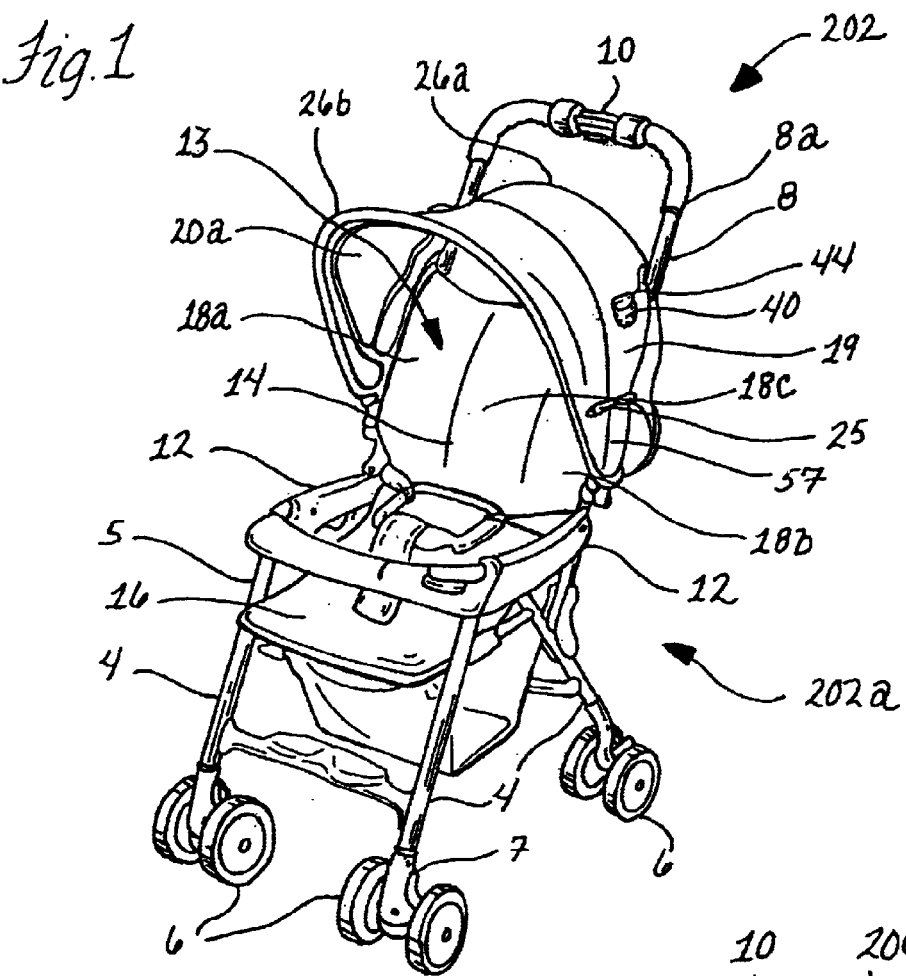
FIGS. 1–3 are perspective views of the audio system in accordance with the present invention showing a stroller and retractable canopy thereof with pockets on the canopy for carrying speakers and an audio source therein.

In one form, child carrying device 202 is a child stroller 202a, as earlier mentioned. More specifically, in the illustrated form, the stroller 202a includes a frame 2 with two pairs of legs 4 on either side of the stroller 202a extending downward and having wheels 6 rotatably attached at their bottoms 7, as shown in FIG. 1. A pair of handle members 8 extend upward and rearward at the rear of the stroller 202a. The pair of handle members 8 are connected to each other at their upper ends 8a by a gripping member 10 and are connected to forwardly extending side members 12 toward their lower ends 8b. The forward and rearward legs 4 in a pair are each connected to one of the side members 12.

A seating area 13 of the stroller 202a is provided by fabric seat 14 attached to the frame 2 of the stroller 202a to provide a place for an infant or toddler to sit. The seat 14 includes a bottom portion 16 suspended from the wheel legs 4 toward upper ends 5 thereof and a backrest portion 18 spanning the handle members 8. The backrest portion 18 can include side sections 18a and 18b that gradually curve outwardly from either side of substantially flat central section 18c thereof. With the child seated in the seating area 13, the fabric seat 14 will generally flex into conformance with the child's body. The seat portions 16 and 18 preferably include cushioning material to provide the child with comfort while seated and riding in the stroller 202a.

The canopy 20 is removably mounted to the stroller 202a and can be extended to selectively cover the seating area 13. As shown in FIGS. 2–6, the canopy 20 includes fabric back cover portion 22 and fabric hood portion 24. Generally, the fabric of the portions 22 and 24 is a single thin layer of flexible fabric material which is distinct from that of the fabric seat 14. The hood portion 24 includes a pair of pivotally connected arch-shaped hoop support members 26 with an intermediate arch-shaped rib support member 28 sewn into the hood portion 24 between the hoop support members 26. In this manner, the hoops 26 and 28 can pivot between an open or extended position, wherein the hood 24 extends over a portion of the seat 14, and a collapsed or retracted position, wherein the hood 24 is folded against the back portion 22 and toward the stroller handle members 8, as shown in FIGS. 4 and 5. In the extended position, the fabric material of the hood 24 is stretched taut between the hoops 26, while in the retracted position the fabric material is collapsed between the hoops 26 so that there are fabric material folds 206 with most of the material of these folds 206 preferably oriented in the interior space under the canopy hood portion 24 (see FIGS. 5 and 24). In this manner, the fabric material will not get too bunched up between the members 26 and 28 causing less than full retraction of the canopy 20.

Pivot assemblies 29 at either end of the hoop support members 26 include pivot mounts 30 each having a downwardly extending pin 32. The bottom ends 208 of the hoop support members 26 are pinned as by a rivet 210 to the pivot mounts 30 with the rear hoop support member 26a captured tightly between integral lugs (not shown) on the plate mount 30 so that only the forward hoop support member 26b pivots relative thereto.

As shown in FIG. 6, to removably mount the canopy 20 to the stroller 202a, the pins 32 of the pivot mounts 30 have a split construction with resilient and flexible legs 34 that are removably inserted into receiving members 36 attached to the lower ends 8b of the handle members 8. For this purpose, the receiving members 36 include a sleeve 38 with a diameter smaller than the normal effective diameter provided by the legs 34 so that they are urged toward each other for fitting into the sleeve 38. With the canopy 20 in place, the legs 34 are biased outward against the inner surface 38a of the sleeve 38 to releasably secure the canopy 20 to the stroller 202a. A radial lip 39 abuts the bottom 38b of the sleeve 38 when the legs 34 are pushed through the sleeve 38 so as to substantially prevent accidental release of canopy 20 from the stroller 202a.

After the pins 32 are in the receiving members 36, the back cover portion 22 is passed between the handle members 8. The back cover portion 22 includes openings or cut out areas 22a and 22b through which the handle members 8 pass. After the handle members 8 are passed through the openings 22a and 22b, the back cover portion 22 has velcro strips to close the openings 22a and 22b around the handle members 8 and by way of corresponding velcro strips on the hood portion 24. Lower ends of the back cover portion 22 also have velcro strips for attaching to a bottom area of the hood 24 having corresponding velcro strips.

The canopy 20 of the stroller 202a includes carry portions for the audio components preferably in the form of pockets 40 generally disposed on opposing sides of the hood 24 in which speakers 108 can be loosely disposed for easy placement into and removal therefrom. As discussed further herein, the positions of the speaker pockets 40 are predetermined and carefully selected to maximize the stereophonic effect of speakers 108 contained therein and to minimize interference with the support members 26 and 28 during retraction of the canopy 20. In addition, the canopy 20 includes a pocket 42 on the back cover portion 22 in which an audio source 21 can be loosely disposed for easy placement into and removal therefrom. Specifically, the speakers 108 are placed in pockets 40 sewn to the opposing side fabric portions 19 of the hood 24 of the canopy 20. In the preferred and illustrated form, the pockets 40 are located between the rear hoop support member 26 and the intermediate rib support member 28, such that when the hood portion 24 is moved to its retracted position, the pockets 40 collapse into the folds 206 formed between the hoop 26 and rib support members 28, as shown in FIG. 5 and FIGS. 24–26. The audio source 21 is placed in a pocket 42 sewn to the outer rear surface of the back cover portion 22. The pockets 40 and 42 are preferably formed of single pieces of fabric material sewn to the canopy single layer fabric material on the outer surface 20b thereof so that at the pocket positions, there will be double layers of fabric material.

A pad assembly 65, such as including a pad 66 and a pad covering 68, can be provided on the inner surface 20a of the canopy 20, as shown in FIG. 7. Specifically, the pad 66 and pad covering 68 are located on the inner surface 20a corresponding to the pocket 42 for the audio source 21, which is located on the outer surface 20b of the canopy 20. The pad 66 is of a soft, resilient material such as foam or the like which provides cushioning and protects a child occupying the child-carrying device 202 from discomfort and/or injury due to bumping of the child's head against the hard plastic or metal housing of most audio sources 21. The pad covering 68 is a piece of fabric that is sewn to the inner surface 20a over the pad 66 to hold the pad 66 in place.

As shown in FIGS. 9 and 10, speakers 108a, 108b, and 108c are attached to the ends 43 of a pair of electrical leads 44, such as an electrical wire or cord. The opposite ends 45 of the electrical leads 44 are connected together at a juncture 46 to form a common electrical lead 47 that terminates in a jack 48, which, in turn, can be connected to the audio source 21. When the audio source 21 is inserted in its pocket 42 and the speakers 108 are positioned in their pockets 40 along the sides 19 of the canopy 20 for operation, the electrical lead 44 is disposed loosely along the outer surface 20b of the canopy 20.

The disposition of the electrical leads 44 along the outer surface 20b of the canopy 20 provides a safety feature in that they are out of the reach of the child inside the stroller 202a. The infant cannot become tangled in or tamper with these leads 44. In contrast to other audio systems having built-in electrical leads such as where electrical leads are woven into, or otherwise contained within, the fabric of the stroller 202a, the electrical leads 44 herein are easily removable and replaceable.

The electrical leads 44 also have a preferred and uniform length so that they are disposed properly along the outside of the canopy 20. In other words, the length of the leads 44 between the speakers 108 and audio source 21 is tailored so that the leads 44 are not pulled taut and in tension nor are they excessively drooping or hanging down along the canopy 20 and stroller 202a when operatively connected to the source 21. If the length is too short, the lead 44 may pull the jack 48 out of the audio source 21 or more likely may pull the speakers 108 out of the pockets 40, especially when there is unanticipated tension created on the lead 44, such as when a parent is pushing the stroller 200 over rough or uneven ground. If the length is too long, the lead 44 may become tangled in the canopy 20, especially when it is extended or retracted, or with objects located outside the canopy 20 as the stroller 202a is pushed along.

Referencing FIG. 9, in one preferred form, the length (a) of the electrical lead portion 47 is 6 inches (150 millimeters) from jack 48 to juncture 46 and the length (b, c) of the electrical lead portion 44 is 12.6 inches (320 millimeters) from juncture 46 to speakers 108a. Lead portion 47 resides in the rear pocket 42, and the length (a) of the lead portion 47 can be sized to allow easy interconnection of the jack 48 with audio sources 21 of various sizes that may occupy different positions in the rear pocket 42. The length (b, c) can be sized to approximate the distance around the canopy 20 between the top edge 51 of the side pockets 40 and the back pocket 42 due to speaker housing 112 and cord or lead configuration as described above while keeping speaker stem portion 110 readily accessible near the top edge 51 of the pocket 40.

Figure 3:
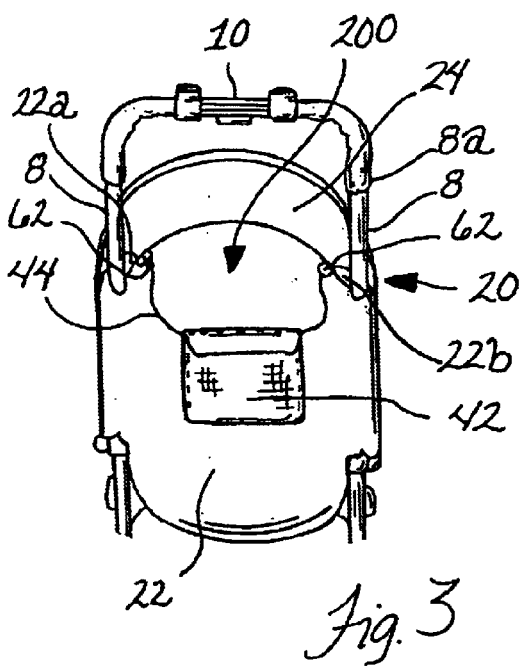

The canopy 20 preferably has a pair of lead holders 62 attached thereto for securing the electrical leads 44 to and defining a pathway for the leads 44 along the outer surface 20b of the canopy 20, as shown in FIGS. 3 and 6, and these holders 62 prevent the electrical lead 44 from sagging and possibly becoming entangled. They also minimize the potential for the speakers 108 being unintentionally pulled out of their respective pockets 40. The holders 62 are preferably located on the canopy 20 in alignment with the rear support member 26a and slightly higher than the level of the side speaker pockets 40. In this manner, the lead pathway via the holders 62 is defined such that the leads 44 each extend out from the side pocket opening 67 and extend with a slight curve upwardly to the holder 62 and then extend from the holder 62 with a slight curve downwardly to the rear pocket opening with the lead juncture 46 and common lead portion 47 residing in the rear pocket 42. These lead holders 62 can include velcro strips, ties, buttons, and snaps. In the most preferred form, velcro strips are used as lead holders 62.

Referring to FIG. 6, there it can be seen that the leads 44 extend along the canopy outer surface 20b with some slight curvature as between the speaker pocket 40 and audio source pocket 42. However, because the length of the lead portion 44 is coordinated with the spacing of the pockets 40 and 42 about the canopy 20, along with the placement of the aforedescribed holders 62, it can be seen that the radius of curvature of the lead portion 44 extending therebetween is substantially maximized. In this manner, excessive lengths of lead line portions 44, which are the only exposed portions of the audio components when in their operative positions, are substantially avoided so as to make it less likely that the leads 44 can get accidentally caught or tangled, or that the speakers 108 will be pulled out from their pockets 40 as a consequence thereof. Of note is the common lead line portion 47 extending from the juncture 46 of the lead line portions 44, which is provided with a length approximately half that of the lead line portions 44, such as previously set forth. This length of lead line 47 substantially obviates any concern of tension forces on the present lead line system causing the plug jack 48 to be pulled out from a corresponding socket in the audio source 21 as generally there will be sufficient slack provided by the lead line 47 to take up such applied tension in the lead line system.

Strain relief members 114 can also be provided for connecting each stem portion 110 of the speaker 108 to the electrical lead 44, as shown in FIGS. 21–22. The strain relief members 114 further assist in keeping tension forces on the speakers 108 to a minimum. Accordingly, should the leads 44 be tensioned or pulled accidentally, the strain relief members 114 make it less likely that the speakers 108 will be pulled out from their pockets 40.

The locations of the pockets 40 for the speakers 108 are optimized in terms of the stereophonic effect provided for the child in the stroller 202a while avoiding the creation of interference problems during retraction operation of the canopy 20. The pockets 40 are preferably situated as low as possible along the sides 19 of the canopy 20 while still having the size needed to fit the speakers 108 therein for easy insertion and removal thereof into and from the pocket 40 and between the rear and center canopy holders or supports such that the canopy 20 can be retracted and still readily retain the speaker-containing pockets 40 between the holders. If the speaker-containing pockets 40 are situated too low, as measured from either the top 59 of the canopy 20 or from the lower ends 57 of the canopy side portions 19, they would likely interfere with the retraction operation of the canopy 20. In other words, because the support members 26 and 28 converge as they extend downwardly, if the speaker 108 in the pocket 40 were to become clamped between these members 26 and 28, their pivoting relative to each other would be stopped relatively early in the retraction of the canopy 20 from its full extended position. If the pockets 40 are situated too high, they will not provide an optimal stereophonic effect as they will be too far out of alignment with the height of where an average sized child's ears would be. As shown in FIG. 8, it has been determined that the optimum location (h) for the pockets 40 in the preferred embodiment is approximately 17 to 19 inches (430 to 483 millimeters) from the seat bottom portion 16 to the center 41 of the pocket 40.

A pair of pivot hinging mechanisms 25 are pivotally mounted between the rear support member 26a and the forward support member 26b on either side of the canopy 20, one of which can best be seen in FIG. 6. The pivot hinging mechanism 25 uses a pair of pivot members 23 and 27 that together define a friction cam lock so that the canopy 20 can be releasably locked in its extended state.

More particularly, the pivot member 23 is pivotally pinned at its rear end 23a to the rear support member 26a, and the pivot member 27 is pivotally pinned at its forward end 27a to the forward support member 26b with these pivot mounting locations being on the vertical runs of the sides 19 of the canopy 20 spaced above the bottom ends 208 of the support members 26 and the respective pivot mounts 30 thereat, such spacing being approximately three to four inches.

The pivot member 27 has a recessed area 27b extending from an intermediate position along the length of the member 27 to its end portion 27c distal from pivot end 27a. A shoulder cam surface 27d extends along the recessed area 27b to the pivot member end portion 27c defining a raised abutment finger 27e thereat and is contoured to cooperate with the pivot member 23 for providing the releasable locking action of the pivot hinging mechanism 25.

The pivot member 23 has an end portion in the form of an oblong extension 23b opposite the pivot end 23a. The extension 23b is pivotally pinned centrally in the recessed area 27b of the pivot member 27 so that an outer curved cam surface 23c on the extension 23b engages the shoulder surface 27d when locking the canopy 20. The pivot location between the members 23 and 27 along with the sizing of their cam surfaces 23c and 27d is such that when the canopy 20 is extended, the members 23 and 27 pivot toward general linear alignment with each other. With the canopy 20 close to full extension, the cam surfaces 23c and 27d will be engaged. To achieve full extension with the canopy material extending taut between the support members 26, a user pushes down on the abutment finger 27e with the curved surfaces 23c and 27d becoming tightly engaged against each other so that the connected pivot member ends 23a and 27a push the respective support members 26a and 26b away from each other, and specifically push forward support member 26b forwardly and away from substantially fixed rear support member 26a. Once the cam surface 23c clears the shoulder surface 27d, the finger abutment 27e will snap down against the upper side of the extension 23b to releasably lock the canopy 20 in its full extended position with the members 23 and 27 in substantial linear alignment with each other.

Figure 24:
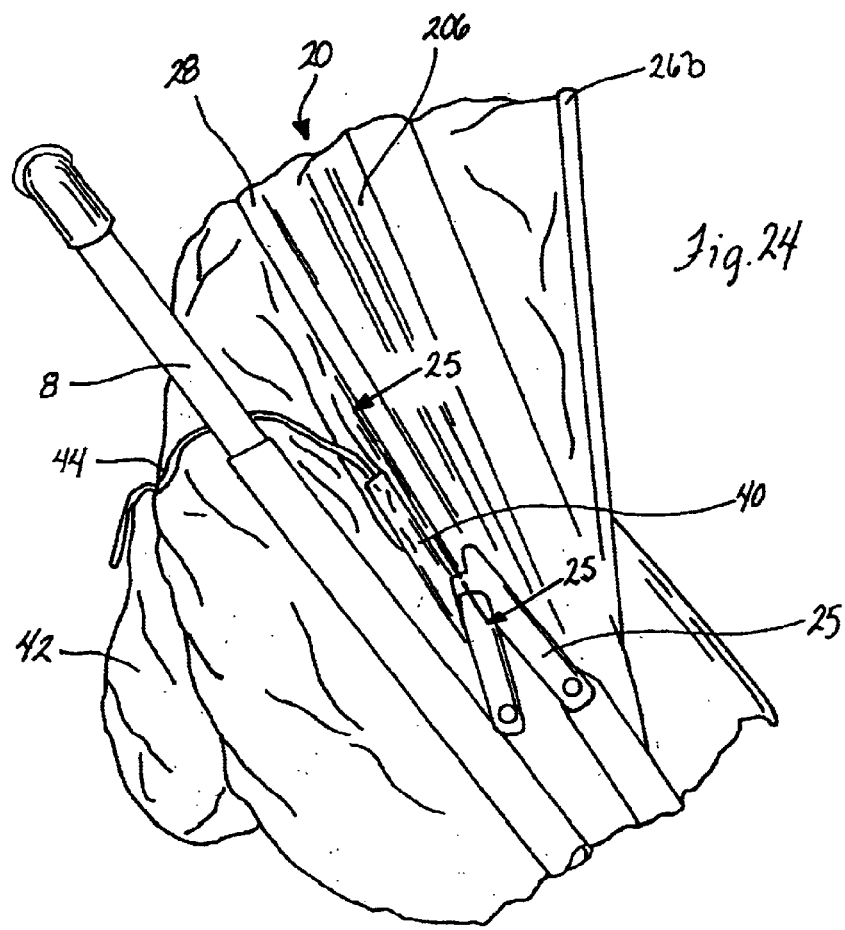
FIG. 24 is an enlarged side elevational view of the canopy in a retracted position showing a pivot hinging mechanism attached to adjacent arcuate support members of the canopy in its released state, and the speaker pocket and speaker therein in interior folds generally clear of the support members.

To retract the canopy 20, a user lifts up on the bottom of the pivot members 23 and 27 to release the cam friction lock. A slight upward pressure will cause pivoting of the members 23 and 27 so that the cam surface 23c is past the point at which it tightly engages against the shoulder surface 27d allowing the members 23 and 27 to freely pivot relative to each other as the canopy 20 is retracted, as shown in FIG. 24. Due to the location of the pivot members 23 and 27 extending along the sides of the canopy 20, the placement of the speaker pockets 40 is further restricted to being thereabove when the members 23 and 27 are linearly oriented in the releasably locked position so as to minimize potential problems in getting the speakers 108 to seat in the pockets 40 when placed therein. When the pivot members 23 and 27 pivot upwardly relative to each other during canopy retraction, it is acceptable for the respective pivot member upper ends 23b and 27c to encroach in the area of the lower level of the pockets 40 as shown in FIG. 24, since the pockets 40 and speakers 108 therein will most likely be shifting into the interior folds 206 of the canopy 20, as previously discussed.

The dimensions of the speaker pockets 40 of the preferred embodiment are shown in greater detail in FIGS. 21–22. A flap 49 is attached to the top of each pocket 40 to retain the speaker 108 therein. The preferred shape of the pockets 40 is a polygon with six sides, although other shapes could also be employed. The top edge 51 is not sewn to provide an opening 69 to accommodate insertion of a speaker 108, and in the preferred embodiment, is 65 millimeters across which is larger than the speaker housing diameter so it fits easily in the pocket 40. The remaining sides of the polygon are all sewn to the canopy 20. Two parallel sides 53 extend downward from the top edge 51 before angling inward toward each other approximately three-fourths of the way to the bottom 55 of the pocket 40. In the preferred embodiment, the sides extend downward approximately 45 millimeters before angling inward. The pocket 40 preferably has a minimal depth of approximately 40 millimeters for properly retaining the preferred compact sized speaker 108 therein. This depth is measured from the top edge 51 of the pocket 40 to the bottom edge 55.

As mentioned, the support members 26 and 28 converge toward each other at the lower ends 57 of the canopy side portions 19, and the sides 53 of the speaker pockets 40 have a similar tapered configuration via lower sections 53a thereof. The side lower sections 53a of the pockets 40 angle inward in order to avoid encroaching too close to the area of the support members 26 and 28 of the canopy 20 and which otherwise could interfere with shifting of the canopy 20 to its retracted position. In this manner, the pockets 40 have a generally tapered configuration from midway down from the pocket top to the bottom thereof generally following the contour of the canopy material as it tapers down between the converging support members 26 and 28. The bottom edge 55 is parallel to the top edge 51 and, in the preferred embodiment, is approximately 35 millimeters wide, approximately the same size as the diameter of the speaker housing 112 so that the speaker 108 is not too loosely held in the pocket 40.

The flap 49 is attached near the top edge 51 of the pocket 40 and extends along the entire top edge 51 of the pocket 40. The flap 49 hangs over the pocket 40 and may be fastened to the pocket 40 by any appropriate fastening means, such as snaps, buttons, ties, or velcro. In the illustrated and preferred embodiment, the flap 49 is attached to the pocket 40 by velcro.

The pockets 40 are sized to accommodate speaker assemblies 108, which preferably include an integral single piece molded housing 112 that contains a speaker driver with diaphragm (not shown). The speaker driver with diaphragm is the sound generating portion of the speaker assembly 108. The speaker assemblies, or speakers, 108 are specifically constructed to maximize the quality of the sound while still remaining small enough to fit in the pockets 40 in their preferred location on the canopy 20 as has been discussed. More particularly, the speaker housings 112 have their diameter maximized in size to obtain the desired high quality of sound while still being small enough to fit within the limited size of the pockets 40, i.e., between the intermediate and rear canopy support members 28 and 26a at a predetermined height along the canopy 20.

The thickness of the speaker housing 112 also is considered. The speaker housing thickness is designed as thinly as acoustically reasonable to accommodate the desired low profile of the pockets 40. This allows the amount of pocket fabric material to be minimized so that the space between the pocket fabric piece and the underlying canopy fabric is only sufficiently large as that necessary to accommodate the thin profiled speakers 108 therein. In addition, it is desirable for each speaker 108 to be small enough and thin enough to allow a speaker-containing pocket 40 to be foldable between adjacent support members 26 and 28 of the canopy 20, preferably into the interior space under the canopy 20. If the speaker housing 112 is too large, it may not be able to shift into these interior folds 206 which may unduly interfere with the folding action of the canopy 20.

The speaker design represents a compromise between optimum sound reproduction and portability. The speakers 108 used in the audio system are large enough to generate a high quality sound. The speakers 108 were designed in light of the distance between the speakers 108 located in the canopy 20 and the ears of the infant in the seat 14. As will be discussed further herein, because of this distance, the speakers 108 are chosen with characteristics that enable them to focus sound outwards rather than inwards, as is true of speakers of a similar size used with headphones.

The speaker housings 112 are provided with a highly specific construction for use with the audio system herein. Other conventional compact speakers have been designed for headphones or to fit directly in the ear of a listener. Speakers used with headphones often have an upper hollow stem into which the bottom ends of a hoop brace of the headphone is slid. The speaker wires or cords generally extend out from the bottom of the housing opposite the upper stem. Accordingly, the normal headphone speaker construction is not particularly well-suited for use in the present audio system. Speakers that fit directly in the ear are also inadequate because they do not produce a sufficient volume and quality of sound given the distance between canopy 20 and infant and the canopy material interposed therebetween.

As shown in FIGS. 14–22, the speaker housing 112 herein has a generally annular configuration, and lacks padding material as in conventional speaker ear phones since it is not to be engaged against an ear. The electrical lead 44 of the speakers 108 exits from an integral and tangentially extending stem portion 110 of the annular housing 112 that serves as the handle for the speaker 108. Thus, the normal placement of the speaker 108 in the pocket 40 with the stem 110 extending along the top edge 51 thereof will conveniently orient the speaker wire 44 for extending out from the product for its positioning along the side 19 and rear 22 of the canopy 20 to connect to the audio source 21 in the rear pocket 42 and to allow the lead 44 to easily exit the pocket 40 when the pocket flap 49 is closed while the speaker 108 is retained therein. The minimal depth of the pocket 40, as measured from the top edge 51 to the bottom edge 55, is approximately the diameter of the speaker housing 112 for retaining the speaker 108 in the pocket 40.

The speakers 108 can be retained indefinitely in the side pockets 40 of the canopy 20. They need not be removed after the stroller 202a is used. In addition, when the stroller 202a is not in use, it may be folded, as shown in FIGS. 4 and 5. The speakers 108 may be retained in the pockets 40 when the stroller 202a is folded for convenient storage. In contrast to other audio systems for child-carrying devices that use built-in components, any audio component of the present invention, including speakers 108, can easily be removed and repaired or replaced if it becomes defective. Alternatively, the entire audio system may be removed and used with another application.

Figure 23:
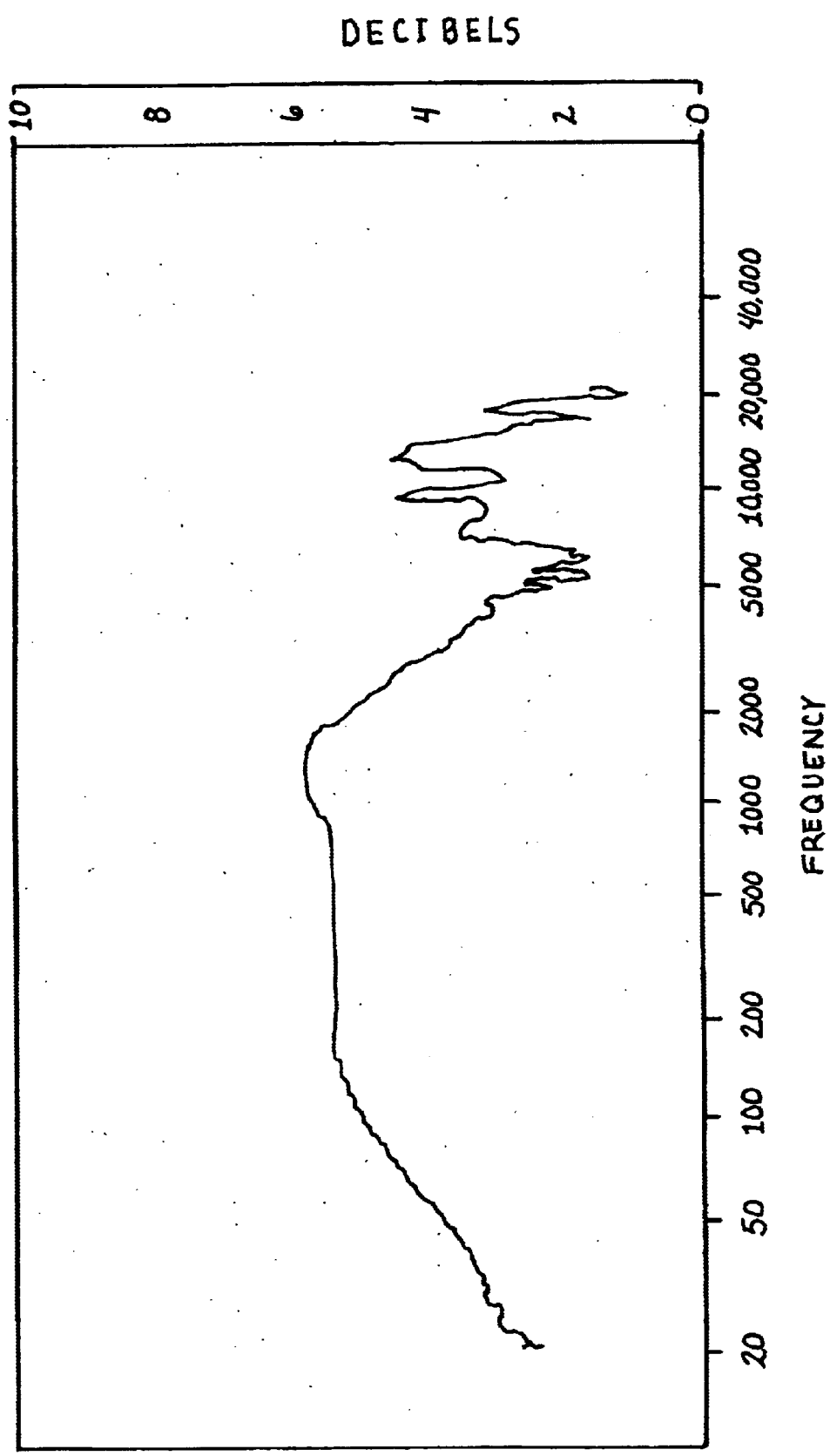
FIG. 23 is a graph showing the acoustic performance of the present speaker as a function of frequency.

In the preferred embodiment, the speakers 108 have dimensions that are tailored so that they fit conveniently within the pockets 40 and provide high quality sound. The optimum location for the pockets 40 on the canopy 20 was carefully selected in order to maximize the quality of sound reproduction for the range of motion of the infant. As shown in the graph of FIG. 23, the acoustic performance and distortion of the speaker 108 were determined as a function of frequency. The speaker 108 is constructed so that there was little distortion, which is shown by the gentle slope of the graph, especially up to the frequency of 5000 Hertz. By way of example and not limitation, the speaker 108 preferably has the following range of dimensions: speaker driver diameter of approximately 20 to approximately 32 millimeters, speaker housing diameter of approximately 30 to 40 millimeters, and a speaker housing thickness of approximately 11 to approximately 16 millimeters. In the most preferred embodiment, the dimensions of the speaker 108 are: speaker driver diameter of 1.06 inches (27 millimeters), speaker housing diameter of 1.42 inches (36 millimeters), speaker housing height of 1.58 inches (40 millimeters), speaker housing length of 1.65 inches (42 millimeters), and speaker housing thickness of 0.53 inches (13.5 millimeters). With the stem portion 110, the distance from its tip end 110a across the most preferred size of the speaker housing 112 is 42 millimeters which still allows it to comfortably be fit through the speaker pocket opening 69 which is preferably sized at 65 millimeters thereacross.

In addition, in one preferred form, the speakers 108 have an impedance of 32 ohms, a sensitivity of 103 decibels, and a frequency range of 20 to 20,000 Hertz. The sensitivity of the speaker 108 is high to improve its efficiency. The impedance is low to produce a higher volume and fuller sound and thus a higher quality sound for the use of the small speakers 108 herein. The low impedance also allows the speakers 108 to avoid placing undue power demands on the audio source 21. Accordingly, the present speakers 108 can be used with conventional battery-powered audio sources without sacrificing battery life.

In addition, as shown in FIGS. 17 and 18, the speaker housing 112 has a front wall portion 119 and a rear wall portion 120. The speaker 108 generates sound, which emanates through the front wall portion 119. The rear wall portion 120 of the speaker 108 contains one or more small apertures, and preferably six, that improve the quality of the sound of the speaker 108, which has been found to be particularly important due to the compact, small size of the speaker housing 112 herein. The apertures permit construction of a smaller housing 112 than would otherwise be possible. Without the apertures, the speaker 108 exhibits a high peak in its lower frequency response, resulting in a more distorted sound at lower frequencies. Thus, providing apertures in the rear wall 120 of the speaker 108 results in a smoother frequency response at low frequencies so that there is high quality sound from the speakers 108 across the full range of frequencies.

The speaker housing 112 is preferably of a sufficiently thin profile to minimize interference with retraction of a canopy 20, but the speaker driver must be sufficiently large to generate a sufficient quantity and quality of sound to be heard by a child occupant. The speaker 108, however, must maintain a predetermined minimum distance between the speaker housing 112 and the speaker driver. Without this minimum distance, the sound generated by the speaker driver likely will be muffled or distorted by the housing 112.

Figure 25:
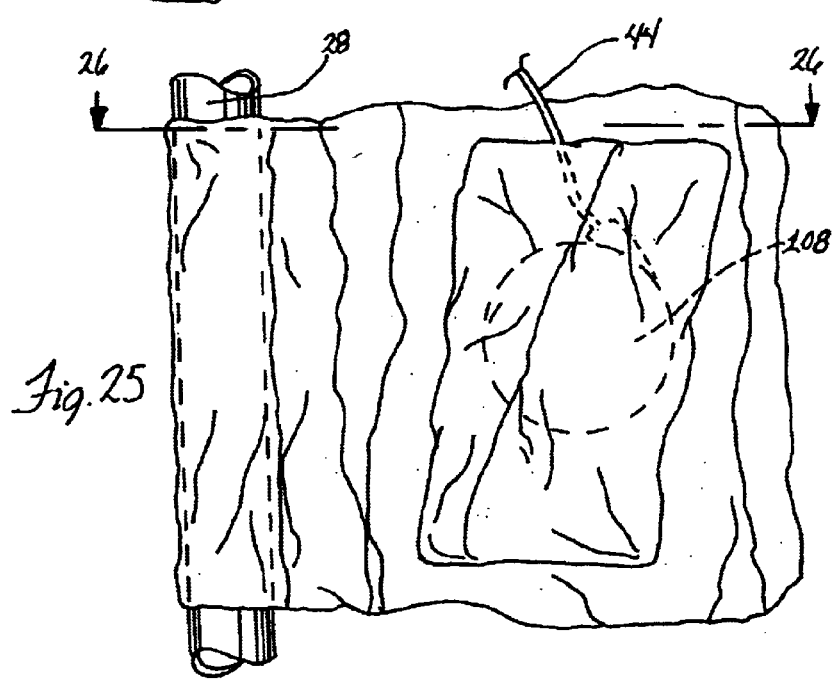
FIG. 25 is a front elevational view taken along line 25—25 of FIG. 24 showing the pocket and speaker.
Figure 26:
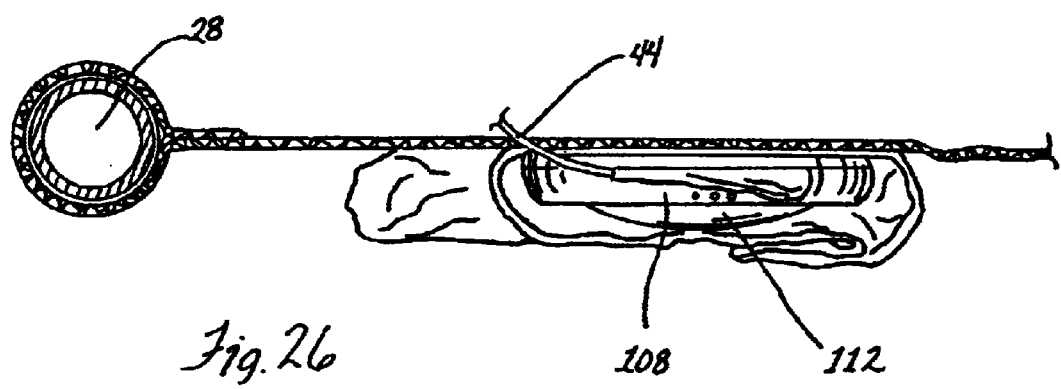
FIG. 26 is a plan view taken along line 26—26 of FIG. 25 showing the ability of the flexible canopy and pocket fabric material to adapt for fitting in the interior folds of the retracted canopy.

The importance of the thickness of the speaker housing 112 and the speaker pocket location on the canopy 20 is shown in FIGS. 24–26. FIG. 24 shows the canopy 20 in a retracted position. When the canopy 20 is retracted, the movement of the support members 26 and 28 toward each other results in collapsing canopy fabric material that gathers in interior folds 206. As shown in FIG. 24, the speaker 108 and speaker pocket 40 herein are more likely to be retained in interior folds 206 of the fabric material.

FIGS. 25 and 26 show more specifically how the speaker 108 and speaker pocket 40 are retained in the folds 206 of the canopy 20. When the canopy 20 is retracted, the pivot hinging mechanism 25 is positioned alongside the speaker pocket 40. As can be seen, if the speaker housing 112 is too large and bulky, the speaker pocket 40 may extend outward from the interior folds 206 of the canopy 20 between the support members 26 and 28 and interfere with the closing movement of the pivot hinging mechanism 25. In other words, if the speaker housing 112 is too bulky, it may not fit entirely within the folds 206 of the canopy 20 and likely will prevent the support members 26 and 28 from reaching a fully retracted position closely adjacent to or against each other. As shown in FIGS. 25 and 26, the compact size of the speaker 108 allows it to be retained entirely in interior folds 206 of the canopy 20, spaced inwardly clear of the illustrated support member 28 so as not to project between the support members 26 and 28.

FIGS. 25 and 26 show generally how the fabric material of the speaker pocket 40 folds around the speaker 108 when the canopy 20 is retracted. The folded pocket fabric material, as shown in FIGS. 25 and 26, is not intended to represent the preferred configuration of the speaker pocket 40, as would be seen when the canopy 20 is extended and the fabric material associated with the pocket 40 is pulled taut. As described above, this preferred speaker pocket configuration, as shown in FIGS. 21 and 22, is a polygon with six sides having an open top edge 51 and with a flap 49 disposed in covering relationship thereto.

A variation of the child stroller 202a is the twin stroller 122 (for use with two children), as shown in FIG. 13. The characteristics of the audio source 21 and speakers 108 of the twin stroller 122 are essentially the same as the characteristics of the ordinary child stroller 202a. The sizing of the electrical leads 44 and 47, however, is different. As shown in FIG. 10, in the preferred embodiment, there are two sets 52 and 54 each having a pair of electrical lead portions 44 that join together to form a common lead portion 47 terminating in a jack 48. The pair of jacks 48 can be connected to a twin jack 56, which can be connected, in turn, to the audio source 21.

As shown in FIG. 13, the audio source 21 can be interchangeably placed in either rear pocket 42 of the twin stroller 122. When the source 21 is placed in a rear pocket 42, i.e., the left rear pocket 42a, the sizing of the electrical lead portions 44 and 47 for the corresponding canopy 20, i.e., the left canopy 20c, will be the same as for the ordinary child stroller 202a. The relative position of the audio source with respect to the speaker pockets 40 is the same in both instances, and the lengths of the lead portions 44 and 47 between audio source 21 and pockets 40 are therefore the same. Thus, as shown in FIGS. 9 and 10, the dimensions (a, b, c) of the electrical lead portions 44 and 47 are the same for ordinary child stroller 202a and the twin stroller 122.

The dimensions of the lead portions 44 and 47 for the non-corresponding canopy 20, i.e., the right canopy 20d, however, are different. This difference results because the audio source 21 is positioned differently with respect to the non-corresponding canopy 20 than it is in the ordinary child stroller 202a version. The audio source 21 is behind and to one side, i.e., to the left, of the non-corresponding canopy 20, rather than being directly behind the canopy 20. Thus, the audio source 21 is a greater distance from the speaker pockets 40 located on the non-corresponding canopy 20, i.e., the right canopy 20d, and the leads 44 and 47 to the pockets of the non-corresponding canopy 20 must be sized differently to accommodate this change in distance.

In contrast to the leads 44 and 47 for the ordinary child stroller 202a, the lead portion 47 of the non-corresponding set 54 is longer and exits the rear audio pocket 42a, and the lead portions 44 of the non-corresponding set 54 are of unequal lengths. The dimensions of the leads 44 and 47 from the audio source 21 to the pockets 40 of the non-corresponding canopy 20 are shown in FIG. 10 as d, e, f. In the preferred form, the dimensions (d, e, f) of the non-corresponding set 54 of leads 44 and 47, i.e., the leads disposed along the right canopy 20d, are as follows: 9.1 inches (230 millimeters) from jack 48 to juncture 46, 4 inches from juncture 46 to the left speaker 108b, and 17.7 inches (450 millimeters) from juncture 46 to the right speaker 108c.

The twin stroller 122 also has lead holders 62 to secure the electrical leads 44 to the stroller 122. These lead holders 62 are essentially the same as those for the ordinary child stroller 202a. Additionally, the twin stroller 122 has a velcro strip 64 located above both audio pockets 42, and the electrical lead portion 44 can be secured to the velcro strip 64 above the audio source pocket 42 that is not in use.

In another form, the canopy audio system is used with a child rocker 202b and is shown in FIGS. 11–12. Although the general structure of the activity rocker 202b is different from the child stroller 202a, both rocker 202b and stroller 202a employ a similar canopy and audio system in the canopy. The audio system of the activity rocker 202b also includes two speakers 108 connected to an audio source 21 (such as a CD player, mini disc player, MP3 player, tape recorder/player, or radio), all of which are mounted to the retractable canopy 88 on the rocker 202b. Again, the audio components are not built-in; they are easily removable and replaceable.

More specifically, the rocker 202b includes a frame 70 with a supporting base 72. The base 72 comprises two substantially parallel and arcuate longitudinal base members 74 that have wheels 76 rotatably attached to the front end 74a of each member 74. The rear ends 74b of the longitudinal base members 74 are attached to feet 78. The base 72 further includes three transverse base members 80 that are substantially parallel and extend between and connect the two longitudinal base members 74.

The base 72 is connected to two pairs of support legs 82 and 86. The first pair 82 is attached to the wheels 76 and the support legs 82 extend upwardly and rearwardly and provide a mounting surface for the seat 84 of the rocker 202b. The second pair of support legs 86 extends upward from the base and are attached to the first pair of support legs 82. A seat 84 is attached to the frame 70 of the rocker 202b to provide a place for an infant or toddler to sit.

As with the stroller embodiment of the invention, a canopy 88 is removably mounted to the rocker 202b. The rocker canopy 88 is substantially similar to the canopy 20 used with the stroller 202a. As shown in FIGS. 11–12, the canopy 88 includes fabric back cover 90 and hood portions 92. The canopy 88 also includes a rear hoop support member 94, a forward hoop support member 96, and an intermediate support member 98.

The canopy 88 of the rocker 202b includes pockets 100 and 102 on the outer sides 88a and rear surface 88b thereof in which the speakers 108 and audio source 21 can be loosely disposed for easy placement into and removal therefrom. Specifically, the speakers 108 are placed in pockets 100 sewn to the outer opposing side fabric portions 88a of the hood 92 of the canopy 88. The pockets 100 are located between the rear hoop support member 94 and the intermediate support member 98, such that when the hood portion 92 is moved to its retracted position, the pockets 100 collapse into folds formed between the hoop and rib support members. The audio source 21 is placed in a pocket 102 sewn to the outer rear surface 88b of the back cover portion 90.

The nature of the audio system components used with the rocker 202b are very similar to the components used with the stroller 202a. The characteristics of the audio source 21 and speakers 108 of the child rocker 202b are essentially the same as the characteristics of the ordinary child stroller 202a. In addition, the locations of the pockets 100 and 102 for the speakers 108 and audio source 21 are essentially the same. The length of the electrical lead 44 and 47 used to connect audio source 21 and speakers 108, however, is different. As shown in FIG. 9, in the preferred form of the rocker, the length (a) of the electrical lead portion 47 is 17.7 inches (450 millimeters) from jack 48 to juncture 46 and the length (b, c) of the electrical lead portion 44 from juncture 46 to speakers 108a is 16 inches (400 millimeters). The difference in length is dictated by the different structure of the rocker 202b. Again, the electrical lead 44 is sized to fit the canopy 88 with the proper tension, i.e., not too tight but not too loose, as previously described with respect to the single stroller version 202a.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A combination of a child seating device and an audio system therefor, the combination comprising:

a seating area of the device for supporting a child thereon;

a canopy of fabric material that is extendable so that the fabric material extends over the seating area, the canopy material having an inner surface generally facing the seating area and an outer surface facing away from the seating area with the canopy extended;

support members of the fabric canopy that are shiftable relative to each other and having portions thereof closely adjacent each other when the canopy is retracted with the canopy fabric collapsed therebetween, the support member portions being spaced from each other when the fabric canopy is extended over the seating area;

opposing side fabric portions of the canopy extending between the support members and having fabric pocket portions attached to the outer surface thereof at predetermined positions above the seating area;

an audio source and a pair of speaker assemblies distinct from the audio source each including a sound generating portion and a housing portion with the distinct speaker assemblies allowing for a low profile configuration for the housing portion so that when placed in the fabric pocket portions, the low profile housing portion along with the predetermined positions of the fabric pocket portions above the seating area minimize interference with the support members and the collapsing side fabric portions as the canopy is retracted.

2. The combination of claim 1, wherein the predetermined positions of the fabric pocket portions are between adjacent support members of the canopy with the pocket portions generally including centers that are located a predetermined vertical distance above lower ends of canopy side portions when the canopy is extended to provide sufficient surface area on the canopy side fabric portions for the fabric pocket portions attached thereto.

3. The combination of claim 1, wherein the seating area includes a seat bottom portion and the pockets are spaced from the top of the canopy along the opposing side portions and are spaced a predetermined vertical distance from the seat bottom portion to produce the optimum stereophonic sound as heard in the seating area from speaker assemblies removably disposed in the pockets.

4. The combination of claim 1, further including a pivot hinging mechanism for the support members and having a locked position in which the canopy is releasably locked in a full extended position thereof and the pivot hinging mechanism is clear of the side pocket portions.

5. The combination of claim 1, including an audio source and an electrical lead of a predetermined length sized for disposition about the canopy to allow secure electrical interconnection of the speaker assemblies to the audio source while minimizing excessive drooping or hanging of the lead therebetween.

6. The combination of claim 5, wherein the canopy includes holders for keeping the electrical lead closely adjacent the canopy as it extends thereabout.

7. A child-carrying device, comprising:

a seating area for supporting a child therefor having a seat bottom portion;

a canopy of fabric material having an extended position for allowing selective covering of the seating area and a retracted position to expose the seating area;

a plurality of support members to which the canopy material is mounted;

a pivot mount for the support members allowing the support members to move towards and away from each other for shifting of the canopy therebetween;

a hood portion of the canopy material having a top portion and opposing side portions depending from the top portion;

a back cover portion of the canopy fabric material;

a pair of speaker pockets located on the outer surface of the opposing side portions of the canopy hood with the speaker pockets being spaced a predetermined vertical distance from the seat bottom portion to produce the optimum stereophonic sound as heard in the seating area from speaker assemblies removably disposed in the pockets;

an opening of each of the speaker pockets for allowing speakers to be removably placed in the pockets through the openings; and an audio source pocket located on the outer surface of the back cover portion of the canopy in which an audio source can be removably disposed for being connected to the speakers with an electrical lead extending about the canopy with the audio source pocket being intermediate the pair of speaker pockets about the canopy to provide the canopy with three distinct pockets thereon.

8. The child-carrying device of claim 7, wherein the back cover portion has openings; and handle portions of the device that can extend through the back cover portion openings to allow the canopy to be removably mounted to the child-carrying device.

9. The child-carrying device according to claim 7, wherein the canopy includes resiliently flexible mounts for removably mounting the canopy to a stroller or rocker.

10. The child-carrying device of claim 7, wherein the canopy side portions include lower ends, and the support members converge toward each other at the lower ends of the canopy side portions; and the speaker pockets have a generally tapered configuration to generally conform to the convergence of the support members.

11. The child-carrying device of claim 7, wherein the speaker pockets are located between adjacent support members of the canopy and have centers that are located at a predetermined vertical distance above the lower ends of canopy side portions when the canopy is extended, selected to optimize sound from speakers carried in the pockets as heard in the seating area and to minimize interference between speakers carried in the pockets and support members during shifting of the support members.

12. The child-carrying device of claim 7, wherein the speaker pockets have upper openings through which speakers can be placed into and removed from the pockets, and flaps for being in covering relationship to the pocket openings.

13. The child-carrying device of claim 7, wherein the back cover portion of the canopy includes a pad assembly aligned with the audio source pocket to provide cushioning for an audio source therein.

14. The child-carrying device of claim 7, wherein the electrical lead has ends with the lead being split at one end thereof for being fixedly connected to each of the speakers, and at the other end includes a jack for electrical connection to said audio source to allow transmission of audio signals to the speakers.

* * * * *